United States Patent [19]

Dunn, Jr.

[11] 3,773,706
[45] Nov. 20, 1973

[54] METHOD FOR INDICATING STAGE OF CURE OF CROSSLINKED RESINS AND COMPOSITIONS RESULTING THEREFROM

[75] Inventor: Harold F. Dunn, Jr., Longmont, Colo.

[73] Assignee: International Business Machines Corporation, Armonk, N.Y.

[22] Filed: Nov. 26, 1971

[21] Appl. No.: 202,589

[52] U.S. Cl. .......................... 260/37 EP, 260/37 N
[51] Int. Cl. ............................................ C08g 51/14
[58] Field of Search .................... 260/37 EP, 37 N, 260/40 TN

[56] References Cited
UNITED STATES PATENTS 3,287,156  11/1966  Griffith ................................ 117/72
3,030,329  4/1962  Warnsdorfer .................. 260/37 EP
3,207,614  9/1965  Canevari ............................ 106/287
3,390,121  6/1968  Burford et al. ...................... 260/40 R Primary Examiner—Lewis T. Jacobs
Attorney—Donald W. Margolis et al.

[57] ABSTRACT

This invention discloses the use of phenosafranin with crosslinkable synthetic organic polymer resins as a visible qualitative degree-of-cure indicator. It also discloses the use of phenosafranin to enhance visibility of thin film of resin and to serve as a visible degree-of-mixing indicator. This invention also discloses novel compositions of matter containing curable synthetic organic polymer resins in combination with phenosafranin and dye.

11 Claims, No Drawings

METHOD FOR INDICATING STAGE OF CURE OF CROSSLINKED RESINS AND COMPOSITIONS RESULTING THEREFROM

BACKGROUND OF THE INVENTION

1. Field of the Invention

This invention relates to methods of testing the degree-of-cure of crosslinked synthetic polymer resins by the inclusion of phenosafranin as a stain in the composition. It also relates to the synthetic curable organic resins to which the dye has been added.

2. Description of the Prior Art

Various types of crosslinked synthetic organic polymers are formed by the reaction of one or more component compounds, with or without a curing agent, and with or without the benefit of heating above ambient temperatures. There are many types of synthetic crosslinked polymers, with the epoxy family, the phenoxy family, and the polyurethane family being nonlimiting examples. Crosslinked polymers are utilized as adhesives and coatings, as well as in a multitude of other uses. After the components of a crosslinked polymer have been brought together under reactive conditions, the crosslinking reaction proceeds at a given speed, usually a function of the temperature, until crosslinking has been completed at all available reactive sites. When complete crosslinking has occurred, the polymer is referred to as having been "cured." The ability to identify complete curing, as well as the onset of curing and the progress of curing, is useful.

It is desirable to identify the onset or near completion of curing so that application of the resin can be completed before crosslinking has proceeded too far to make it workable. It is also useful to be able to identify when curing of an applied resin has been completed so that one might know when one can rely upon its adhesive or coating qualities. Once crosslinking has been completed, the resins are generally tough, hard, intractable and generally insoluble. Therefore, they must be applied before this cured stage is reached and similarly, once applied, it may be relied upon once this cured state is reached. It is therefore desirable to be able to determine the degree of cure and final curing of a synthetic cross-linked polymer.

It has also been taught in the prior art that a dye may be added to one or more components of a multicomponent synthetic organic resin so that during mixing, complete mixing can be determined by the uniformity of distribution of the dye throughout the mixture. In order to be useful, such dyes must have a distinct color which is not overshadowed by the colors of the components of the mixture. Furthermore, it is desirable to add a distinctive color to a polymeric resin which is to be coated in a very thin layer so that the completeness and uniformity of coating can be visually determined.

Heretofore, a small number of coloring components or families of coloring components have been identified as being useful as identifying degree-of-cure or degree-of-mixing of synthetic organic resins. However, these prior art materials are specific in nature and do not include phenosafranin. Furthermore, none of the dye materials identified as cure or mix indicators in the prior art have been identified as being useful to identify degree-of-cure for a broad spectrum of crosslinked polymers. It is therefore desirable to identify a dye material which has universal application to a broad number of crosslinked synthetic organic resin polymers.

In order for a dye to be able to fulfill this multitude of requirements, it must possess a distinct, strong color which color undergoes a change when crosslinking is completed, and preferably a separate and distinct color change at the outset of cross-linking.

SUMMARY OF THE INVENTION

In accordance with this invention, a method of testing the degree-of-cure of crosslinked synthetic polymer resin systems by the inclusion of phenosafranin stain in the composition is disclosed. As a qualitative test for degree-of-cure, phenosafranin is added to a to-be-cured synthetic resin system in either crystalline powder form, or previously dissolved in a suitable compatible solvent, or mixed with one or more components of the reaction mixture. When complete mixing of the reaction components is obtained, the composition will have a uniform color. At the outset of curing, the mixture will begin to change color and continue to change color until curing is completed.

As a qualitative test for degree-of-cure, phenosafranin is unexcelled for its speed, ease of application, ease of interpretation after standardization, and its stability. The degree-of-cure is indicated by striking color changes which progress as curing progresses. Furthermore, it is completely reproducible for a given system. The specific color changes observed during curing depend upon the type of resin system in which the phenosafranin has been incorporated, and vary from system to system.

While the use of phenosafranin as a degree-of-cure indicator in crosslinked resins is a novel application, phenosafranin also exhibits distinct advantages over many commonly used dyes and pigments which are utilized to determine degree of mixing and completeness of coating. It provides a very intense color in both the cured and uncured state making possible the use of low concentrations of material in various visual applications. Furthermore, it exhibits a chemical reactivity with the resin system during curing which reactivity locks in the dye and prevents it from blooming to the surface to discolor adjacent components or from being washed out under adverse conditions.

The foregoing and other objects, features and advantages of the invention will be apparent from the following more particular description of preferred embodiments of the invention.

DESCRIPTION OF THE PREFERRED EMBODIMENTS

It has been found when phenosafranin is incorporated into numerous crosslinking synthetic organic resin systems and the resin system submitted to its normally employed curing cycle, that a striking color change occurs which coincides with the curing of the resin. Phenosafranin is otherwise known as Safranin B Extra or 3,7-diamino-5-phenylphenazinium chloride. It is a basic dye of the safranine family which is lustrous green in its crystalline form and with an empirical molecular formula of $C_{18}H_{15}ClN_4$ and a molecular weight of 322.79. It also has a Colour Index 2d Edition, Volume 3 (1957), Number of 50,200 and is commerically available from Eastman Organic Chemicals as stock number 1125. It is prepared by dichromate oxidation of 1 mole p-phenylinediamine hydrochloride and 2 moles aniline hydrochloride.

As detailed hereinafter, phenosafranin has been added to epoxy, phenoxy/epoxy and polyurethane systems which have undergone curing, and in each instance, it has exhibited a striking color change at both the outset of curing and upon final curing. It is postulated that by employing the method of the present invention and adding phenosafranin to any synthetic organic resin crosslinking system, a color change will take place upon curing.

Normally, but not inclusively, the initial color of the phenosafranin after it is placed into solution or added to the reaction mixture is a brilliant red or pink. The color change is then coincident with the progress of the curing reaction, for example, through shades of violet to a deep brilliant royal blue. Changes from the initial red to shades of yellow have also been noted. In each instance, once the range of color changes for a system have been determined, they can be used as a reliable indicator of degree-of-cure as they are highly reproducible. As would be expected, the higher the curing temperature, where curing is obtained through heating, the quicker the curing occurs and the quicker the signature curing color is indicated in the resin. As used herein, the term "color change" means formation of a different color, loss of original color, or intensification of the original color.

The depth or magnitude of intensity of the color of the initial mixture and the final resin is simply controlled by controlling the concentration of the phenosafranin and the thickness of the resin film. It has been determined that concentrations within in the range of about 0.001% to about 2.0% phenosafranin, by weight of solids, is sufficient for most visual and cure indication uses, while a range of about 0.01% to about 1% is preferred. However, there are merely practical limits in that lesser concentrations are visible under many circumstances, and greater concentrations can be used, but without adding to the visual effects of this invention. The use of any amount of phenosafranin affects the color of the resin system, while the concentration of the phenosafranin affects the color intensity.

The addition of phenosafranin to a curable synthetic organic resin does not alter the normally employed curing procedures or reaction components. It has also been found that the addition of phenosafranin in the preferred range of concentration does not affect the physical properties of the resin system. The only effect observed is the desired effect of providing a visible color and inducing a color change coincident with curing.

In incorporating phenosafranin into a resin system, it is preferably dissolved in the system or in one component of the system, although in some cases, it may be incorporated as a finely divided dispersed or partially dissolved mixture. Mixing of the phenosafranin with the resin system or with a component of the resin system is most easily done while the system or component are in the liquid state. In some instances, it may be desirable to warm the mass to liquify it or to use a suitable solvent to accomplish phenosafranin incorporation or to utilize a combination of these techniques or of other similar techniques to obtain the desired mixing.

In multiple component resin systems, such as those requiring the addition of a curing agent, phenosafranin may be added to any or all of the components, as desired; however, if initial incorporation of the dye is into only one of the components, the color imparted thereto will aid in the thorough mixing of the entire system by carrying out mixing in such a manner and for such a time that a uniform color is obtained in the reaction mixture.

EXAMPLE I

A commerical proprietary epoxy/phenoxy/curing agent mixture dissolved in a solvent and sold by Minnesota Mining and Manufacturing Company as EC-2290 resin was obtained. To a sample of EC-2290 containing about 21 percent solids was added a pink alcohol solution of 2.5 percent phenosafranin, by weight, in an amount such that the phenosafranin was equal to 0.1 percent, by weight, of the total solids of the EC-2290 resin. After thorough mixing, as indicated by a uniform pink color throughout the mixture, the resin was uniformly coated upon an aluminum surface, with the uniformity of coating being apparent from the color of the mixture as imparted by the phenosafranin. Three additional pieces of aluminum were coated in a similar manner with the EC-2290-phenosafranin mixture. On yet another piece of aluminum, a pink coating of phenosafranin and alcohol was brushed. The several pieces of resin coated aluminum were then placed in different ovens at temperatures of 60°, 100° and 150° C, respectively. The aluminum coated with the pink phenosafranin and alcohol solution was also placed in the 150° C oven. It was then observed that each of the phenosafranin/EC-2290 mixtures progressed through a series of color changes from the initial red, through several shades of purple and violet, and, ultimately, to a final color of brilliant royal blue. The time required for complete curing in each of these systems exhibited an inverse relationship to the temperature, with the 150° C sample reaching final cure within twenty minutes, the 100° C sample reaching final cure within 180 minutes, and the 60° C sample not obtaining cure until after about 3,000 minutes. However, in each case, when complete cure was obtained, the color was the same brilliant royal blue. The sample of aluminum coated with the phenosafranin and alcohol mixture, without resin, did not exhibit any color change after 3 hours in an oven at 150° C, other than the conversion of the pink alcohol solution to green irridescent crystals, which are the normal form of dry phenosafranin.

EXAMPLES II-V

Phenosafranin was incorporated with other resin systems in much the same manner as in Example I, and in concentrations of from about 0.001 percent to about 2 percent, by weight, of the total solids. The resin systems in which the phenosafranin was incorporated and the temperature, time of cure, initial color and color upon reaching complete cure are noted in Table I, which also includes the data from Example I.

TABLE I

| Example No. | Resin System | Uncured color | Temp. (° C.) | Time (min.) | Cured color |
|---|---|---|---|---|---|
| I | Phenoxy/epoxy: 3M, EC-2290 | Red<br>Red<br>Red | 150<br>100<br>60 | 20<br>180<br>3,000 | Royal blue.<br>Do.<br>Do. |
| II | Epoxy: Shell, Epon 828 epoxy, 10 g. and diethylaminopropylamine, 0.7 g. | Red | 150<br>100<br>60<br>23 | 10<br>40<br>500<br>1,000 | Yellow.<br>Do.<br>Do.<br>Do. |
| III | Shell, Epon 828 epoxy, 10 g.; and Nadic methyl anhydride, 9.0 g.; and benzyldimethylamine, 0.4 g. | Red | 100–150 | ND | Yellow/orange. |
| IV | Polyurethane: DuPont, 46960 polyester, 10 g.; and DuPont, RC-805 isocyanate, 0.5 g. | Red | 100–150 | ND | Royal blue. |
| V | DuPont, Adiprene polyurethane, 10 g. and methylene bisorthochloroaniline, 1.0 g. | Red | 100–150 | ND | Do. |

NOTE.—ND=Not Determined.

This series of examples is broadly indicative of the fact that this invention is applicable to all families of curable synthetic organic polymers and that it is independent of the type of curing agent that is used.

As an aid in determining the effect which phenosafranin had on the physical properties of a resin system, the following procedure was followed. Phenosafranin was dissolved in a sample of EC-2290 phenoxy/epoxy in amounts of 0.1 percent and 1 percent, by weight, of the solids. Resin sample with no dye added were also prepared. Each of the resins and resin dye mixtures was then utilized to laminate foils of 0.006 inch thick etched aluminum with a 0.001 inch thick glue line for the purpose of testing and comparing the adhesive peel strength of the systems with and without dye, in the following manner. Etched aluminum sheets were uniformly sprayed with one each of the previously prepared resin systems, dried open-faced under room temperature conditions for about 15 minutes, then at 100° C for 15 minutes. Under these conditions, the color of the dyed systems remained pink, and the control system, without dye, a clear straw color. The systems were then bonded to other foils and cured in their laminated forms and under flattening pressure at 180° C for 60 minutes. Following curing, the laminates were cooled and tested for peel strength using an Instron Universal Tester at a peel rate of 0.5 inch per minute to apply a T/peel test. For all of the samples, both with and without phenosafranin added and among those samples having different quantities of phenosafranin added, the peel strength was found to be the same. The resins in the cured systems containing phenosafranin exhibited a bright blue color indicative of complete curing. The resin to which no phenosafranin had been added appeared to be the same clear straw color it was prior to curing.

It is therefore seen that the addition of phenosafranin to resin systems would appear to have no effect upon their adhesive strength.

In an effort to determine the stability and extractability of the phenosafranin from both cured and uncured resin systems, the following procedure was followed. Phenosafranin was added to a sample of EC-2290 phenoxy/epoxy resin. Four sheets of aluminum were coated with the resin dye mixtures and cured at 150° C for 20 minutes. One each of these pieces of aluminum was placed in acetone at room temperature, in water at room temperature, in boiling acetone, and in boiling water. In each of these four tests, no effect was observed on either the cured resin or upon the dye. The resin remained firm and unchanged, and the dye was not extracted from the cured resin in any detectable amount.

When four additional plates of aluminum were coated with the EC-2290 and phenosafranin mixture, not cured, and subjected to the same solvent and heating conditions, a substantial change was noted in both the resin and the dye. The acetone caused both the uncured resin and the dye to dissolve and separate under both ambient and boiling conditions. The water caused partial dissolution of the dye, but no dissolution of the resin under both room temperature conditions and boiling conditions. This data is indicative of the fact that some form of reaction has occurred between the dye and the resin during the curing reaction which makes it impossible to extract the dye from the cured system. This reaction may also be the cause of the observed color change.

Finally, measurements were made by differential scanning calorimetry to determine whether the resin systems exhibited a signature curing exotherm concurrent with their final color change. The results are set forth in Table II.

TABLE II.—EVALUATIONS BY DIFFERENTIAL SCANNING CALORIMETRY

Instrument conditions: Perkin-Elmer DSC-1B; scan rate, 20°/min.; sensitivity, 32; temperature range of study within −40° C. to 280° C.

| Resin System | Curing exotherm Range, ° C. | Peak, ° C. | Comments and observations |
|---|---|---|---|
| 3M, EC-2290, phenoxy/epoxy | 155–240 | 195 | Color change from red to blue coincident with exotherm. |
| Shell, Epon 828, epoxy diethylaminopropylamine phenosafranin (1%). | 65–160 | 140 | Color change from red-violet (partial dispersion) to yellow tone coincident with exotherm. |
| DuPont, 46960 polyester DuPont, RC-805 isocyanate (5%) phenosafranin (1%). | 60–140 and 140–200. | ND | Color change from red to blue coincident with curing. |

NOTE.—ND=Not Determined.

It is apparent from the data in this Table that the color change is indeed coincident with the curing exotherm of the resin system and is a true indication of final curing.

The objects, advantages and principles of this invention are broadly applicable and are not limited to the specific steps, methods, compositions or combinations herein described. Other advantages and uses of this invention may be learned by experimentation with the invention and may require optimization for a given system without departing from the principles of the invention. In any event, it has been clearly shown that the use of phenosafranin with a broad range of crosslinkable synthetic organic resin systems produces a composition which is useful in enhancing the visibility of thin coated films, a visible degree-of-mixing indicator when used in multicomponent systems, and particularly as a visible, qualitative degree-of-cure indicator.

While the invention has been particularly shown and described with reference to preferred embodiments thereof, it will be understood by those skilled in the art that various changes in form and details may be made therein without departing from the spirit and scope of the invention.

What is claimed is:

1. The method of indicating various stages through which a curable synthetic organic resin system passes comprising:
    mixing a curable synthetic organic resin system with phenosafranin, said resin system during curing capable of interaction with phenosafranin to produce a color change; and then
    curing said resin system with a substance which enters into the curing reaction and becomes part of the final cured product, said mixture indicating by a color change the degree of curing of said resin system.

2. The method of claim 1 wherein the phenosafranin constitutes from about 0.001 percent to about 2 percent, by weight of solids, of said system.

3. The method as defined in claim 2 wherein said cured synthetic organic resin is selected from the group consisting of phenoxy/epoxy, epoxy and polyurethane.

4. The method of claim 3 wherein the synthetic organic resin is a phenoxy/epoxy.

5. The method according to claim 3 wherein the synthetic organic resin is epoxy.

6. The method according to claim 3 wherein the synthetic organic resin is polyurethane.

7. As a composition of matter, a mixture of a curable synthetic organic resin system and phenosafranin, said resin system capable of inter-action with phenosafranin to produce a color change when cured with a substance which enters into the curing reaction and becomes part of the final cured product.

8. The composition of claim 7 wherein said curable synthetic organic resin system is selected from the group consisting of phenoxy/epoxy, epoxy and polyurethane.

9. The composition of claim 8 wherein the resin system is phenoxy/epoxy.

10. The composition of claim 8 wherein the resin system is epoxy.

11. The composition of claim 8 wherein the resin system is polyurethane.

* * * * *